US012679375B2

(12) United States Patent
Lee

(10) Patent No.: US 12,679,375 B2
(45) Date of Patent: Jul. 14, 2026

(54) VEHICLE CONTROL DEVICE AND METHOD, AND VEHICLE SYSTEM

(71) Applicant: HL Klemove Corp., Incheon (KR)

(72) Inventor: Do Kyung Lee, Incheon (KR)

(73) Assignee: HL Klemove Corp., Incheon (KR)

( * ) Notice: Subject to any disclaimer, the term of this patent is extended or adjusted under 35 U.S.C. 154(b) by 160 days.

(21) Appl. No.: 18/633,521

(22) Filed: Apr. 12, 2024

(65) Prior Publication Data

US 2025/0136115 A1 May 1, 2025

(30) Foreign Application Priority Data

Oct. 26, 2023 (KR) ........................ 10-2023-0144607

(51) Int. Cl.
| | |
|---|---|
| *B60W 30/08* | (2012.01) |
| *B60W 30/18* | (2012.01) |
| *B60W 40/04* | (2006.01) |
| *B60W 50/14* | (2020.01) |
| *B60W 60/00* | (2020.01) |
| *B62D 15/02* | (2006.01) |

(52) U.S. Cl.
CPC ...... *B60W 30/18163* (2013.01); *B60W 50/14* (2013.01); *B60W 60/0015* (2020.02); *B60W 2540/30* (2013.01)

(58) Field of Classification Search
CPC ......... B62D 15/029; B60W 30/18163; B60W 50/14; B60W 60/0015; B60W 2540/30; B60W 30/08; B60W 40/04; B60W 40/08; B60W 2050/143; B60W 2510/202; B60W 2520/14

USPC .......................................................... 701/25
See application file for complete search history.

(56) References Cited

U.S. PATENT DOCUMENTS

| | | | |
|---|---|---|---|
| 11,407,427 B2 | 8/2022 | Sato | |
| 2019/0351918 A1* | 11/2019 | Maeng .................. | H04W 4/023 |
| 2021/0101600 A1* | 4/2021 | Kato ......................... | B60Q 1/40 |
| 2021/0237739 A1* | 8/2021 | Hayakawa .......... | B60W 60/001 |
| 2021/0237776 A1* | 8/2021 | Hashimoto ........... | B60W 40/09 |
| 2022/0234607 A1* | 7/2022 | Hata ..................... | B60W 40/08 |
| 2023/0174070 A1* | 6/2023 | Oniwa .................. | B60W 50/14 |
| | | | 701/41 |

(Continued)

FOREIGN PATENT DOCUMENTS

| | | |
|---|---|---|
| JP | 2005-170067 A | 6/2005 |
| KR | 10-2018-0039838 A | 4/2018 |

(Continued)

OTHER PUBLICATIONS

Office Action issued in Korean Patent Application No. 10-2023-0144607 dated Dec. 17, 2025.

*Primary Examiner* — Hossam M Abd El Latif
(74) *Attorney, Agent, or Firm* — Harvest IP Law, LLP

(57) ABSTRACT

Provided are a vehicle control device and method, and a vehicle system. The vehicle control device include a controller operative to control a host vehicle. The controller is operative to determine, during a next lane change activation period during which the host vehicle is able to change lanes from a travel lane to a next lane, at least one of a possibility of the host vehicle changing lanes to an after-next lane or a possibility of an after-next lane vehicle entering the next lane based on vehicle information, and control a warning to be issued to the host vehicle based on the determination results.

15 Claims, 12 Drawing Sheets

(56) References Cited

U.S. PATENT DOCUMENTS

2024/0383494 A1 * 11/2024 Hirosawa .............. B60W 50/14

FOREIGN PATENT DOCUMENTS

| KR | 10-2019-0083317 A | 7/2019 |
|----|-------------------|--------|
| KR | 10-2239014 B1 | 4/2021 |
| KR | 10-2440478 B1 | 9/2022 |

* cited by examiner

NEXT LANE CHANGE ACTIVATION PERIOD

TURN SIGNAL-ON POINT

FIRST TIME POINT

NEXT LANE CHANGE START POINT

SECOND TIME POINT

NEXT LANE CHANGE COMPLETION POINT

THIRD TIME POINT

TURN SIGNAL-OFF POINT

FOURTH TIME POINT

VEHICLE CONTROL DEVICE AND METHOD, AND VEHICLE SYSTEM

CROSS-REFERENCE TO RELATED APPLICATION

This application claims priority from Korean Patent Application No. 10-2023-0144607, filed on Oct. 26, 2023, which is hereby incorporated by reference for all purposes as if fully set forth herein.

BACKGROUND

Field

Embodiments of the disclosure relate to a vehicle control device and method, and a vehicle system.

Description of Related Art

Recently, with the increasing interest in autonomous driving, research and development on driver assistance functions in driving have been actively conducted in vehicle systems.

In particular, among the driver assistance functions in driving, a function of giving a warning to a vehicle is being highlighted as an important technology.

Therefore, there is a need for research and development on a vehicle control device and method that accurately controls the warning generated in the vehicle, and on a vehicle system.

BRIEF SUMMARY

Embodiments of the present disclosure are directed to a vehicle control device and method, and a vehicle system that accurately control a warning to be issued to a vehicle.

In an aspect of the present disclosure, a vehicle control device includes a controller operative to control a host vehicle in a manner as to determine, during a next lane change activation period during which the host vehicle is able to change lanes from a travel lane to a next lane, at least one of a possibility of the host vehicle changing lanes to an after-next lane or a possibility of a vehicle on the after-next lane entering the next lane based on vehicle information, and control a warning to be issued to the host vehicle based on the determination results.

In another aspect of the present disclosure, a vehicle control method performed by a controller is provided, the method including: determining, during a next lane change activation period during which a host vehicle is able to change lanes from a travel lane to a next lane, at least one of a possibility of the host vehicle changing lanes to an after-next lane or a possibility of a vehicle on the after-next lane entering the next lane based on vehicle information, and controlling a warning device to issue a warning to the host vehicle based on the determination results.

In a still another aspect of the present disclosure, a vehicle system includes: a vehicle control device including a controller operative to control a host vehicle; and a warning device operative to issue a warning to the host vehicle, the controller being operative to determine, during a next lane change activation period during which the host vehicle is able to change lanes from a travel lane to a next lane, at least one of a possibility of the host vehicle changing lanes to an after-next lane or a possibility of a vehicle on the after-next lane entering the next lane based on vehicle information, and control the warning device to issue a warning to the host vehicle based on the determination results.

Embodiments of the present disclosure may provide the vehicle control device and method, and the vehicle system that accurately control a warning to be issued to the vehicle.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
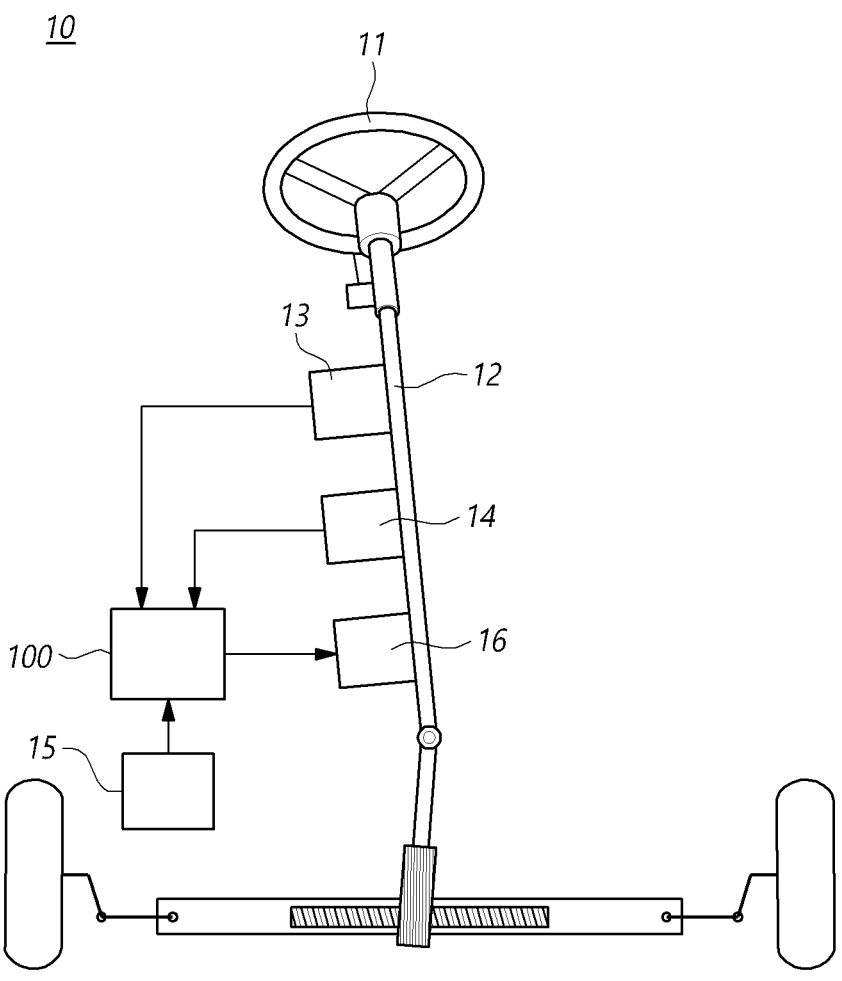
FIG. 1 is a diagram illustrating a steering system according to embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a diagram illustrating a steering system according to the present embodiments.

Referring to FIG. 1, the steering system 10 according to the present embodiments may refer to a system capable of changing a steering angle of a wheel in response to a rotation angle of a steering wheel operated by a driver.

The steering system 10 according to the embodiments may include at least one of, but not limited to, a hydraulic power steering (HPS) system, which provides steering assistance by operating a pump to hydraulic generate pressure, or an electronic power steering (EPS) system, which provides steering assistance by driving a motor, depending on a driving source. The steering system 10 according to the present embodiments may be a mechanical steering system in which a force (torque) generated by the driver rotating the steering wheel 21 is transmitted to a steering motor via a mechanical power transmission (e.g., linkage) such that the wheels are steered by the drive of the steering motor, or a steer-by-wire (SbW) system in which the power is transmitted by sending and receiving electrical signals via wires, cables, etc. instead of the mechanical power transmission, depending on whether a steering feedback actuator (SFA) and a road wheel actuator (RWA) are coupled by a mechanical connection member (or linkage).

The steering system 10 will be described hereinafter with reference to the EPS system, but the present disclosure is not limited thereto.

The steering system according to the present embodiments may be included in the vehicle system 1 to be described later. The vehicle control device 100 may control a steering device 500.

Here, although the vehicle control device 100 according to the present embodiments s may collectively control components included in the vehicle system, the present disclosure is not limited thereto, and the vehicle control device may also control each of the components included in the vehicle system. Accordingly, if the vehicle control device 100 is a device that controls only the steering system 10, the vehicle control device 100 may be referred to as a steering control device.

Specifically, the steering system 10 according to the present embodiments may include at least one of the vehicle control device 100 or the steering device 500.

Here, although the steering device 500 may include at least one of a steering wheel 11, a shaft 12, a steering angle sensor 13, a torque sensor 14, a speed sensor 15, or a steering motor 16, the present disclosure is not limited thereto, and the steering device may include any of components so long as the component is a component for steering. The steering wheel 11 may be rotatable by driver's manipulation. The steering wheel 11 may be coupled to the shaft 12. The shape of the steering wheel 11 may be circular, as illustrated in FIG. 1, but is not limited thereto.

The shaft 12 may be combined with the steering wheel 11 and may rotate with the steering wheel 11. The shape of the shaft 12 may be cylindrical, but is not limited thereto.

Although not illustrated, the shaft 12 may include a plurality of reducers thereon. At least one of the plurality of reducers may be mounted on an outer circumferential surface of the shaft 12.

Although not illustrated, the steering system 10 according to the present embodiments may include a steering column including the shaft 12 and the reducers.

The steering angle sensor 13 may detect a steering angle defined by the rotation of the steering wheel 11. The steering angle sensor 13 may output a steering angle signal indicative of information about the steering angle.

Here, the steering angle may not be detected unless the steering wheel 11 is rotated, and a corresponding steering angle signal may not be output unless the steering wheel 11 is rotated.

The torque sensor 14 may detect the steering torque generated by the rotation of the steering wheel 11. The torque sensor 14 may output a steering torque signal indicative of information about the steering torque.

Here, the steering torque may refer to the torque applied to a torsion bar between an input axis and an output axis of the shaft 12. Thus, the steering torque may be detected even if the steering wheel 11 is not rotated.

The speed sensor 15 may detect the speed of a vehicle and output a speed signal indicative of information about the vehicle speed.

The vehicle control device 100 may receive at least one of a steering angle signal output from the steering angle sensor 13, a steering torque signal output from the torque sensor 14, or a vehicle speed signal output from the speed sensor 15. The vehicle control device 100 may determine a rack stroke for providing an assist torque based on the at least one of the steering angle signal, the steering torque signal, or the vehicle speed signal, and may determine a command current value corresponding to the rack stroke. Here, if the vehicle control device 100 includes an inverter, the vehicle control device 100 may determine the command current value and output the command current to the steering motor 16 via the inverter, but the present disclosure is not limited thereto, and if the inverter is provided separately, the vehicle control device 100 may determine the command current value and the inverter may output the command current to the steering motor 16.

In particular, during a next lane change activation period during which a host vehicle may change lanes from a travel lane to a next lane, the vehicle control device 100 according to the embodiments may determine, based on vehicle information, at least one of a possibility of the host vehicle changing lanes to an after-next lane, or a possibility of a vehicle on the after-next lane entering the next lane, and control a warning to be issued to the host vehicle based on the determination results.

Further, the vehicle control device 100 according to the present embodiments may control the operation of the steering system 10 to cause the host vehicle to change lanes from the travel lane to the next lane, or from the next lane to the after-next lane, during the next lane change activation period.

The steering motor 16 may receive a control signal from the vehicle control device 100 and may be driven with a torque and rotational speed in accordance with a command current. Although not illustrated, the steering motor 16 may be combined with a reducer installed on the shaft 12. With the rotation of the steering motor 16, the reducer installed on the shaft 12 and the shaft 12 may rotate together.

Meanwhile, the rotation of the steering motor 16 may cause the shaft to rotate, and the motion of a rack-and-pinion may cause the wheels to move left or right, thereby allowing the vehicle to steer (e.g., turn, etc.). The steering system 10 may also serve to transmit a rotational motion of the steering motor 16 to a rack bar via a worm-wheel to move the wheels associated with the rack bar to the left or right.

The steering system 10 described above is merely an example, and the present embodiments may also be applied to an R-EPS method of generating an assist torque to the rack bar.

Figure 2:
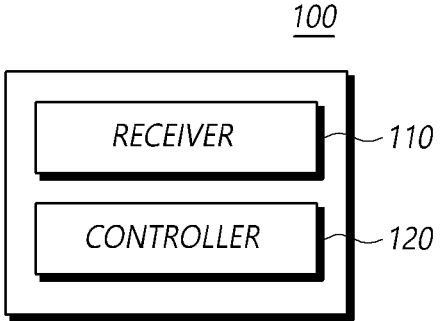
FIG. 2 is a diagram illustrating a vehicle control device according to embodiments.

FIG. 2 is a diagram illustrating a vehicle control device according to the present embodiments.

Referring to FIG. 2, the vehicle control device 100 according to embodiments may include advanced driver assistance systems (ADAS) that provide information to assist in the driving of a vehicle or assist a driver in controlling a vehicle.

As used herein, ADAS may refer to various types of advanced driver assistance systems, which may include at least one of, but not limited to, autonomous emergency braking systems, smart parking assistance systems (SPAS), blind spot detection (BSD) systems, blind spot warning, adaptive cruise control (ACC) systems, lane departure warning systems (LDWS), lane keeping assist systems (LKAS), or lane change assist systems (LCAS), for example.

Here, a blind spot warning system may refer to a system that detects a vehicle approaching a side or rear blind spot of a host vehicle and provides an advance warning to a driver. In particular, a BSW system may utilize ultrasonic sensors or radar sensors to detect objects around a host vehicle.

Such a BSW system may issue a warning if the host vehicle performs a steering operation, such as an operation of changing a travel lane, to cause a change in the detecting area of the sensors and determine that a vehicle traveling on an adjacent lane is approaching the host vehicle.

The vehicle control device 100 according to embodiments may include at least one of a receiver 110 or a controller 120. The receiver 110 and the controller 120 may be coupled to each other.

In particular, the controller 120 included in the vehicle control device 100 according to embodiments may control a host vehicle in a manner as to determine, during a next lane change activation period during which the host vehicle is able to change lanes from a travel lane to a next lane, at least one of a possibility of the host vehicle changing lanes to an after-next lane or a possibility of a vehicle on the after-next lane entering the next lane based on vehicle information, and control a warning to be issued to the host vehicle based on the determination results. Specifically, the receiver 110 may receive vehicle information. For example, the receiver 110 may receive the vehicle information from sensors. Further, the receiver 110 may receive the vehicle information from a vehicle (e.g., on a next lane or an after-next lane). Further, the receiver 110 may receive vehicle information provided by the vehicle in addition to the vehicle information obtained via the sensor.

In other words, the receiver 110 may be a component to which vehicle information may be input, and may include any device and method, as long as the device and method are capable of receiving vehicle information. The receiver 110 may also be a communication device.

The controller 120 may control the vehicle.

For example, the controller 120 may control the operation of at least one of, but not limited to, a turn signal, a warning device, a steering device, a braking device, or a suspension device, and the controller may control any device included in the vehicle system.

In particular, the controller 120 may control a warning that is issued to a vehicle. That is, the controller 120 may control the warning to be issued to the vehicle by controlling the operation of a warning device.

Here, warning may be issued to the vehicle in the form of at least one of, but not limited to, visual sense, audible sense, or tactile sense, and may include any type of warning, so long as the warning may be issued to the driver from the vehicle.

The warning may include, but is not limited to, blind spot warning (BSW), and may include any type of warning, so long as the warning may be issued to the driver from the vehicle.

As used herein, warning may have an equivalent meaning to alarm, alert, etc.

The controller 120 may determine a traveling situation of a vehicle.

For example, the controller 120 may determine a traveling situation of the vehicle based on vehicle information.

Although the vehicle information may include at least one of, but not limited to, a steering torque value, a steering torque direction, a steering angle value, a steering angle direction, a steering angular velocity value, a steering angular velocity direction, a turn signal direction (e.g., a turn signal activation direction), a yaw rate value of the vehicle, a yaw rate direction of the vehicle, a position of the vehicle, a line of a travel lane (e.g., a line of a next lane), the center of the vehicle (e.g., the lateral center of the vehicle), a distance (e.g., a distance to a line of the traveling next lane from the vehicle, and a distance to an offset from the lateral center of the vehicle), vehicle speed, a heading angle of a vehicle traveling on the after-next lane, a lateral distance to a vehicle on the after-next lane, or speed of a vehicle on the after-next lane, the vehicle information may include surrounding environment information, such as surrounding roads, buildings, cautionary signs, surrounding detection areas, and the like, as well as detection information received from a plurality of radars, cameras, and lidars mounted on the vehicle. The radar detection information may be detection results for detection areas of respective radars mounted on the front, lateral front, rear, and lateral rear sides of the vehicle.

In other words, the vehicle information may include any information that enables a determination of a traveling situation of the vehicle.

Here, the vehicle information may include both information related to a host vehicle and information related to other vehicles. Here, the host vehicle may refer to a vehicle that is actually changing lanes from the travel lane to a next lane or an after-next lane that is next to the next lane. Other vehicles may be a vehicle traveling around the host vehicle, and may be referred to as a next lane vehicle, or an after-next lane vehicle.

Accordingly, the vehicle described in these embodiments may be understood as the host vehicle, and the next lane vehicle and the after-next lane vehicle may be understood as other vehicles.

Here, a traveling situation of the vehicle may include any situation related to the traveling of the vehicle, including at least one of, but not limited to, a possibility of the host vehicle changing lanes to a next lane, or a possibility of the after-next lane vehicle entering the next lane.

In particular, the controller 120 may determine, during the next lane change activation period, at least one of the possibility of the host vehicle changing lanes to the after-next lane, or the possibility of the after-next lane vehicle entering the next lane.

Here, the next lane change activation period may refer to a period of time during which a vehicle may change lanes from a travel lane to a next lane (or a period of time during which a vehicle may be able to change lanes, or which is required for a vehicle to change lanes, etc.).

As described above, the controller 120 according to embodiments may determine, during a next lane change activation period during which the host vehicle is able to change lanes from a travel lane to a next lane, at least one of a possibility of the host vehicle changing lanes to an after-next lane or a possibility of a vehicle on the after-next lane entering the next lane based on vehicle information, and may control a warning to be issued to the host vehicle based on the determination results.

Figure 3:
FIG. 3 is a diagram illustrating a next lane change activation period according to embodiments.

FIG. 3 is a diagram illustrating a next lane change activation period according to embodiments of the present disclosure.

Referring to FIG. 3, the next lane change activation period according to embodiments may refer to a period of operation of a turn signal, i.e., a period of the turn signal-on. Thus, the next lane change activation period may include a time period from a turn signal-on to a turn signal-off.

Specifically, the next lane change activation period may include four time points.

Here, the four time points may include: a turn signal-on point, a next lane change start point, a next lane change completion point, and a turn signal-off point.

The turn signal-on point may mean a time point when the turn signal is turned on and the operation of the turn signal starts, i.e., a time point when the vehicle control device controls the turn signal to be turned on, and may be referred to as a first time point.

The next lane change start point may mean a time point when the vehicle starts changing lanes from the travel lane to the next lane, that is, a time point when the vehicle control device controls the vehicle to start changing lanes from the travel lane to the next lane, and may be referred to as a second time point.

The next lane change completion point may mean a time point when the vehicle completes changing lanes from the travel lane to the next lane, that is, a time point when the vehicle control device controls the vehicle to complete changing lanes from the travel lane to the next lane, and may be referred to as a third time point.

The turn signal-off point may mean a time point when the turn signal is turned off and the operation of the turn signal is terminated, that is, a time point when the vehicle control device controls the turn signal to be turned off, and may be referred to as a fourth time point.

Here, the first to fourth time points may be sequential time points, i.e., the first time point may be the earliest time point, followed by the second time point and the third time point, and the fourth time point may be the latest time point.

Referring to FIGS. 2 and 3, the controller 120, according to embodiments may turn on the next lane change function. Here, although the controller 120 may turn on the next lane change function by receiving a next lane change function-ON signal from the driver, the present disclosure is not limited thereto, and the controller may automatically generate the ON signal based on vehicle information and may turn on the next lane change function based on the ON signal.

In particular, after turning on the next lane change function, the controller may activate the next lane change function.

Here, the next lane change function is a lane change function, which may be an LCAS as one of the ADAS functions, an automatically commanded steering function (ACSF), or a result of a driver's direct steering.

The ACSF may refer to a function that automatically evaluates signals generated within the vehicle in conjunction with passive facilities such as lines to assist the driver to trigger control actions, thereby activating the steering device.

The ACSF may mean, for example, a function that assists the driver at the request of the driver at a speed of 10 kilometers per hour or less during traveling at low speed or in parking, or as another example, a function that assists the driver to maintain the vehicle within a selected lane by influencing the lateral movement of the host vehicle, and as a still another example, a function that assists the driver to execute a single lateral maneuver, such as lane change, according to driver's initiation/activation or command.

The controller 120 may, at a first time point, turn on the turn signal. At this time, the controller 120 may activate a next lane change function. At the second time point, the controller 120 may control the host vehicle to initiate a lane change from the travel lane to the next lane. The controller 120 may control the host vehicle to change lanes from the travel lane to the next lane. At the third time point, the controller 120 may control the host vehicle to complete the lane change from the travel lane to the next lane. At the fourth time point, the controller 120 may turn off the turn signal. At this time, the controller 120 may terminate the activation of the next lane change function.

Here, the controller 120 may determine a possibility of collision if a vehicle is present on a lane (next lane or after-next lane) within a predetermined range. If a collision is likely to occur, the controller may control a warning to be issued and terminate the activation of the next lane change function to terminate the lane change, thereby controlling the vehicle to avoid the collision. In addition, if a collision is unlikely to occur, the controller may control the vehicle to change lanes.

Further, the controller 120 may utilize the yaw rate and speed of a host vehicle to determine a predicted path of the host vehicle upon the lane change (to the next lane or after-next lane). The controller 120 may determine a predicted path of a vehicle on a lane (next lane or after-next lane) based on a heading angle and speed of the vehicle on a lane (next lane or after-next lane). Based on the aforementioned predicted paths, the controller 120 may determine a possibility of collision if it is anticipated that a vehicle is present on a lane (next lane or after-next lane) within a predetermined range, and if a collision is likely to occur, the controller may control a warning to be issued and terminate the activation of the next lane change function to terminate the lane change, thereby controlling the vehicle to avoid the collision, and if a collision is unlikely to occur, the controller may control the vehicle to change lanes.

In particular, the predetermined range described above or below is a reference range for issuing a warning such that basically, if other vehicle is within the predetermined range, the warning may be issued, and if other vehicle is not within the predetermined range, the warning may not be issued.

For simplicity of description, the following discussion will focus on how to control the warning if other vehicle is within the predetermined range and there is no possibility of a collision.

The controller 120 according to the embodiments may determine, during the time period from the third time point to the fourth time point, at least one of a possibility of a host vehicle changing lanes to the after-next lane or a possibility of an after-next lane vehicle entering the next lane based on the vehicle information, and may control the warning to be issued to the vehicle based on the determination results.

That is, if the host vehicle is likely to change lanes to the after-next lane during the time period from the third time point to the fourth time point, the controller 120 may control the issuance of the warning to be maintained, and if the host vehicle is unlikely to change lanes to the after-next lane, the controller may control the issuance of the warning to be maintained if the after-next lane vehicle is likely to enter the next lane, and may control the issuance of the warning to be suppressed if the after-next lane vehicle is unlikely to enter the next lane.

Specifically, the controller 120 may determine, during the time period from the first time point to the third time point, whether a vehicle is present on the next lane within a predetermined range.

In an example, if a vehicle is not present in the next lane within the predetermined range, the controller 120 may control the warning not to be issued. In addition, the controller 120 may control the vehicle to complete the lane change from the travel lane to the next lane.

In another example, if a vehicle is present on a next lane within a predetermined range, the controller 120 may control a warning to be issued. In addition, the controller 120 may control the vehicle to complete the lane change from the travel lane to the next lane.

The controller 120 may determine, during the time period from the third time point to the fourth time point, whether a vehicle is present on an after-next lane within a predetermined range.

In an example, when the controller 120 controls a warning not to be issued if a vehicle is not present within a predetermined range on the next lane during the time period from the first time point to the third time point, if a vehicle is not present within a predetermined range on an after-next lane during the time period from the third time point to the fourth time point, the controller 120 may maintain the control operation that no warning is issued. In addition, the controller 120 may control the vehicle to change lanes from the next lane to the after-next lane, or may control the vehicle to travel on the next lane. The controller 120 may then turn off the turn signal.

In another example, when the controller 120 controls warning not to be issued if a vehicle is not present within a predetermined range on the next lane during the time period from the first time point to the third time point, if a vehicle is present within a predetermined range on the after-next lane during the time period from the third time point to the fourth time point, the controller 120 may control the warning to be issued.

When the controller 120 controls the warning to be issued if a vehicle is present on the after-next lane within a predetermined range during the time period from the third time point to the fourth time point, the controller 120 may determine the possibility of the host vehicle changing lanes to the after-next lane based on the vehicle information.

If the host vehicle is likely to change lanes to the after-next lane, the controller 120 may control the issuance of the warning to be maintained, and if the host vehicle is unlikely to change lanes to the after-next lane, the controller 120 may determine the possibility of the after-next lane vehicle entering the next lane based on the vehicle information. In addition, if the host vehicle is likely to change lanes from the next lane to the after-next lane, the controller 120 may control the host vehicle to complete the lane change from the next lane to the after-next lane. The controller 120 may then turn off the turn signal.

If the after-next lane vehicle is likely to enter the next lane, the controller 120 may control the issuance of the warning to be maintained, and if the after-next lane vehicle is unlikely to enter the next lane, the controller 120 may control the warning to be suppressed. In addition, the controller 120 may control the vehicle to travel on the next lane. The controller 120 may then turn off the turn signal.

In another example, when the controller 120 controls a warning to be issued if a vehicle is present within a predetermined range on the next lane during the time period from the first time point to the third time point, if a vehicle is not present within a predetermined range on an after-next lane during the time period from the third time point to the fourth time point, the controller 120 may control the issuance of the warning to be terminated. In addition, the controller 120 may control the host vehicle to change lanes from the next lane to the after-next lane, or may control the host vehicle to travel on the next lane. The controller 120 may then turn off the turn signal.

In another example, when the controller 120 controls a warning to be issued if a vehicle is present within a predetermined range on the next lane during the time period from the first time point to the third time point, if a vehicle is present within a predetermined range on an after-next lane during the time period from the third time point to the fourth time point, the controller 120 may control the issuance of the warning to be maintained.

When the controller 120 controls the issuance of the warning to be maintained if a vehicle is present on the after-next lane within a predetermined range during the time period from the third time point to the fourth time point, the controller 120 may determine the possibility of the host vehicle changing lanes to the after-next lane based on the vehicle information.

If the host vehicle is likely to change lanes to the after-next lane, the controller 120 may control the issuance of the warning to be maintained, and if the host vehicle is unlikely to change lanes to the after-next lane, the controller 120 may determine the possibility of the after-next lane vehicle entering the next lane based on the vehicle information. In addition, if the host vehicle is likely to change lanes from the next lane to the after-next lane, the controller 120 may control the host vehicle to complete the lane change from the next lane to the after-next lane. The controller 120 may then turn off the turn signal.

If the after-next lane vehicle is likely to enter the next lane, the controller 120 may control the issuance of the warning to be maintained, and if the after-next lane vehicle is unlikely to enter the next lane, the controller 120 may control the warning to be suppressed. In addition, the controller 120 may control the vehicle to travel on the next lane. The controller 120 may then turn off the turn signal.

Figure 4:
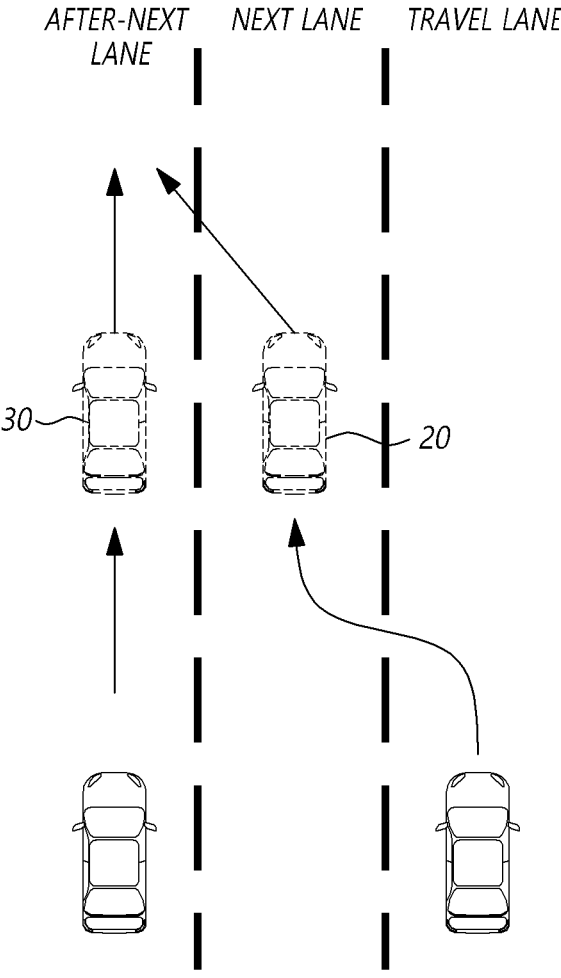
FIGS. 4 to 6 are diagrams illustrating examples of warning control via a vehicle control device according to embodiments.
Figure 5:
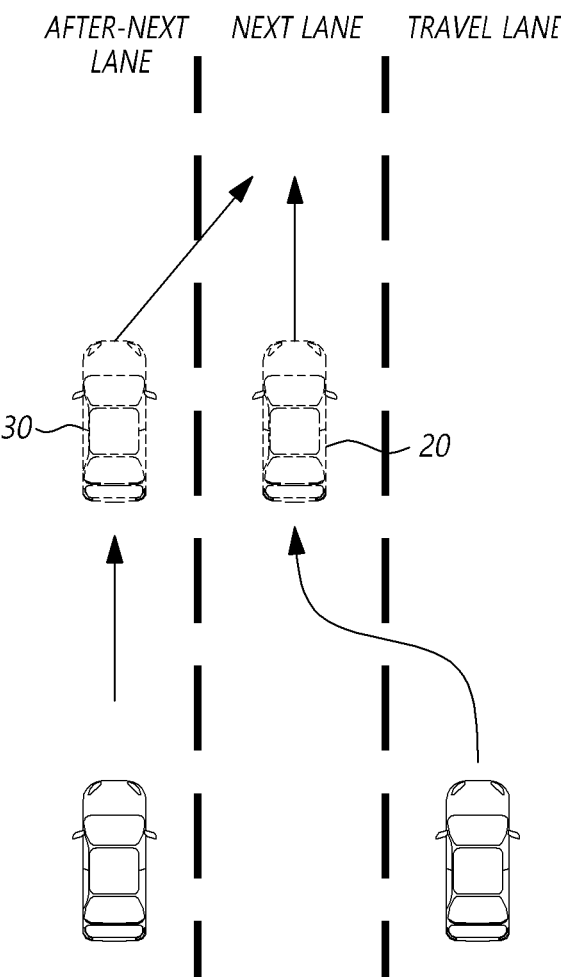
Figure 6:
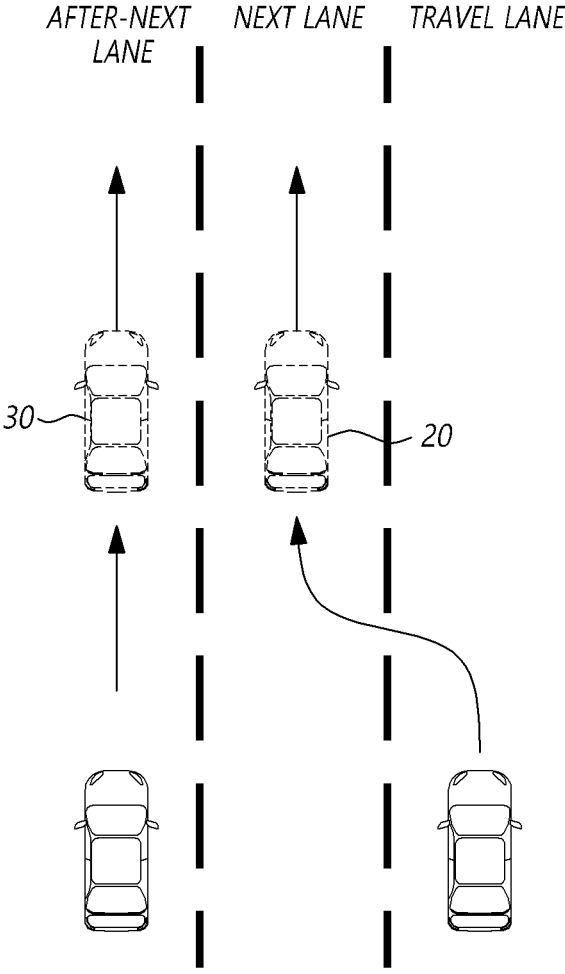

FIGS. 4 to 6 are diagrams illustrating examples of controlling a warning via a vehicle control device according to embodiments of the present disclosure.

Referring to FIGS. 4 to 6, when the controller 120 controls a warning not to be issued if a vehicle is not present within a predetermined range on the next lane during the time period from the first time point to the third time point, if a vehicle 30 is present within a predetermined range on an after-next lane during the time period from the third time point to the fourth time point, the controller 120 may control the warning to be issued.

Referring to FIG. 4, when the controller 120 controls the warning to be issued if the vehicle 30 is present on the after-next lane within a predetermined range during the time period from the third time point to the fourth time point, the controller 120 may determine the possibility of the host vehicle 20 changing lanes to the after-next lane based on the vehicle information.

If the host vehicle 20 is likely to change lanes to the after-next lane, the controller 120 may control the issuance of the warning to be maintained. In addition, the controller 120 may control the host vehicle 20 to complete the lane change from the next lane to the after-next lane. The controller 120 may then turn off the turn signal.

Referring to FIG. 5, if the host vehicle 20 is unlikely to change lanes to the after-next lane during a time period from the third time point to the fourth time point, the controller 120 may determine the possibility of the after-next lane vehicle 30 changing lanes to the next lane based on the vehicle information.

If the after-next lane vehicle 30 is likely to change lanes to the next lane, the controller 120 may control the issuance of the warning to be maintained. In addition, the controller 120 may control the host vehicle 20 to travel on the next lane. The controller 120 may then turn off the turn signal.

Referring to FIG. 6, if the host vehicle 20 is unlikely to change lanes to the after-next lane during a time period from the third time point to the fourth time point, the controller 120 may determine the possibility of the after-next lane vehicle 30 entering the next lane based on the vehicle information.

If the after-next lane vehicle 30 is unlikely to change lanes to the next lane, the controller 120 may control the issuance of the warning to be suppressed. In addition, the controller 120 may control the host vehicle 20 to travel on the next lane. The controller 120 may then turn off the turn signal.

Continuing to refer to FIGS. 1 to 6, the controller 120 may determine the driver's intention to change lanes to the after-next lane based on vehicle information, and may determine a possibility of the vehicle changing lanes to the after-next lane based on the determination results.

For example, the controller 120 may determine the driver's intention to change lanes to the after-next lane based on the vehicle information, and if there is a driver's intention to change lanes from the next lane to the after-next lane, the controller may determine that the vehicle is likely to change lanes to the after-next lane.

The controller 120 may determine the driver's intention to change lanes to the after-next lane based on the vehicle information, and if there is no driver's intention to change lanes from the next lane to the after-next lane, the controller may determine that the vehicle is unlikely to change lanes to the after-next lane.

Specifically, the controller 120 may determine the driver's intention to change lanes to the after-next lane by determining at least one of a driver's override situation, a vehicle's yawing situation, a vehicle's positioning situation, and a vehicle's predicted path situation based on the vehicle information, and may determine the possibility of the vehicle changing lanes to the after-next lane based on the determination results.

In other words, the controller 120 may determine a driver's override situation based on the vehicle information, and if there is the driver's override situation, the controller 120 may determine that there is a driver's intention to change lanes from the next lane to the after-next lane so that the vehicle is likely to change lanes to the after-next lane.

The controller 120 may determine the driver's override situation based on the vehicle information, and if there is no driver's override situation, the controller 120 may determine that there is no driver's intention to change lanes from the next lane to the after-next lane so that the vehicle is unlikely to change lanes to the after-next lane.

Here, the driver's override may mean that the driver intervenes in the traveling of the vehicle.

For example, the driver's override may be meant to apply emergency braking or directly intervene in the steering of the vehicle to change lanes to prevent a collision if the driver determines that the autonomous vehicle is not properly perceiving the situation on the road, being at risk of colliding with other vehicle or pedestrian.

Here, although the vehicle information may include at least one of, but not limited to, a steering torque value, a steering torque direction, a steering angle value, a steering angle direction, or a turn signal direction (e.g., a turn signal activation direction), the vehicle information may include any information, so long as the information may determine the driver's override.

For example, if the steering torque value is greater than or equal to a first threshold value and the steering angle value is greater than or equal to a second threshold value, the controller 120 may determine that the driver's override situation has occurred. Additionally, if the steering torque value is less than the first threshold value, or the steering angle value is less than the second threshold value, the controller 120 may determine that the driver's override situation has not occurred.

That is, if the steering torque value or the steering angle value is greater than the threshold values such that the controller 120 determines that the vehicle is attempting to change lanes from the next lane to the after-next lane, the controller 120 may determine that the driver's override situation has occurred.

Here, if the steering torque direction and the steering angle direction are in the turn signal activation direction, the controller 120 may determine that the driver's override situation has occurred.

Here, if the steering torque direction and the steering angle direction are not in the turn signal activation direction, the controller 120 may determine that the driver's override situation has not occurred.

Further, the controller 120 may determine a vehicle's yawing situation based on the vehicle information, and if the vehicle's yawing situation is a lane change yawing situation, the controller 120 may determine that there is a driver's intention to change lanes from the next lane to the after-next lane so that the vehicle is likely to change lanes to the after-next lane.

The controller 120 may determine a vehicle's yawing situation based on the vehicle information, and if the vehicle's yawing situation is not a lane change yawing situation, the controller 120 may determine that there is no driver's intention to change lanes from the next lane to the after-next lane so that the vehicle is unlikely to change lanes to the after-next lane. Here, although the vehicle information may include at least one of, but not limited to, a vehicle's yaw rate value, a vehicle's yaw rate direction, and a turn signal direction (e.g., a turn signal activation direction), the vehicle information may include any information, so long as the information may determine the driver's yawing situation.

For example, the controller 120 may determine that the vehicle's yawing situation is a lane change yawing situation if a vehicle's yaw rate value is greater than or equal to a third threshold value. Further, the controller 120 may determine that the vehicle's yawing situation is not a lane change yawing situation if the vehicle's yaw rate value is less than the third threshold value.

Here, the controller 120 may determine that the vehicle's yawing situation is a lane change yawing situation if the yaw rate direction is in the turn signal activation direction.

The controller 120 may determine that the vehicle's yawing situation is not a lane change yawing situation if the yaw rate direction is not in the turn signal activation direction.

Further, the controller 120 may determine a vehicle's positioning situation based on the vehicle information, and if the vehicle's positioning situation is a lane change positioning situation, the controller 120 may determine that there is a driver's intention to change lanes from the next lane to the after-next lane so that the vehicle is likely to change lanes to the after-next lane.

The controller 120 may determine the vehicle's positioning situation based on the vehicle information, and if the vehicle's positioning situation is not a lane change yawing situation, the controller 120 may determine that there is no driver's intention to change lanes from the next lane to the after-next lane so that the vehicle is unlikely to change lanes to the after-next lane. Here, although the vehicle information may include at least one of, but not limited to, a vehicle's position, a line of a travel lane (e.g., a line of a next lane), the center of the vehicle (e.g., the lateral center of the vehicle), a distance (e.g., a distance to a line of the traveling next lane from the vehicle, and a distance to an offset from the lateral center of the vehicle), or a turn signal direction (e.g., a turn signal activation direction), the vehicle information may include any information, so long as the information may determine the vehicle's positioning situation.

For example, if the vehicle's position is in a lane change position (e.g., after-next lane change position), the controller 120 may determine that there is a driver's intention to change lanes from the next lane to the after-next lane so that the vehicle is likely to change lanes to the after-next lane.

If the vehicle's position is not in a lane change position (e.g., after-next lane change position), the controller 120 may determine that there is no driver's intention to change lanes from the next lane to the after-next lane so that the vehicle is unlikely to change lanes to the after-next lane.

In an example, the controller 120 may determine that the vehicle's position is in a lane change position (e.g., after-next lane change position) if a distance between a lane corresponding to the activated direction of the turn signal, i.e., a lateral line of the next lane, and the front tire of a vehicle is less than or equal to a fourth threshold value.

Further, the controller 120 may determine that the vehicle's position is not in a lane change position (e.g., after-next lane change position) if the distance between a lane corresponding to the activated direction of the turn signal, i.e., the lateral line of the next lane, and the front tire of the vehicle is greater than the fourth threshold value.

In another example, the controller 120 may set an offset at a predetermined point lateral to the vehicle's travel lane, i.e., the next lane, compare the offset and the lateral center of the vehicle to obtain the distance difference therebetween, and determine whether the vehicle's position is in a lane change position (e.g., after-next lane change position) based on the distance difference. That is, the controller 120 may determine that the vehicle's position is in a lane change position (e.g., after-next lane change position) if the distance difference between the offset and the lateral center of the vehicle is less than or equal to a fifth threshold value. Further, the controller 120 may determine that the vehicle's position is not in a lane change position (e.g., after-next lane change position) if the distance difference between the offset and the lateral center of the vehicle is greater than the fifth threshold value.

Further, the controller 120 may determine a predicted path situation of the vehicle based on the vehicle information, and if the predicted path situation of the vehicle is in a predicted lane change path situation, the controller 120 may determine that there is a driver's intention to change lanes from the next lane to the after-next lane so that the vehicle is likely to change lanes to the after-next lane.

The controller 120 may determine a predicted path situation of the vehicle based on the vehicle information, and if the predicted path situation of the vehicle is not in a predicted lane change path situation, the controller 120 may determine that there is no driver's intention to change lanes from the next lane to the after-next lane so that the vehicle is unlikely to change lanes to the after-next lane.

Here, the vehicle information may include at least one of a vehicle's yaw rate or vehicle speed.

Therefore, the controller 120 may determine a predicted path of the vehicle based on the yaw rate and speed of the vehicle, and if the predicted path of the vehicle is in a predicted lane change path, the controller may determine that there is a driver's intention to change lanes from the next lane to the after-next lane so that the vehicle is likely to change lanes to the after-next lane.

The controller 120 may determine a predicted path of the vehicle based on the yaw rate and speed of the vehicle, and if the predicted path of the vehicle is not in a predicted lane change path, the controller may determine that there is no driver's intention to change lanes from the next lane to the after-next lane so that the vehicle is unlikely to change lanes to the after-next lane.

As described above, the vehicle control device according to the present embodiments may determine the possibility of the vehicle changing lanes to the after-next lane and perform warning control in a state in which the turn signal of the vehicle is turned on after the vehicle has changed lanes from the travel lane to the next lane, thereby providing a more accurate warning to the driver.

Continuing to refer to FIGS. 1 to 6, the controller 120 may determine an after-next lane vehicle's intention to change lanes to the next lane based on vehicle information, and may determine a possibility of the after-next lane vehicle entering the next lane based on the determination results.

For example, the controller 120 may determine an after-next lane vehicle's intention to change lanes to the next lane based on vehicle information, and may determine that the after-next lane vehicle is likely to enter the next lane if there is an after-next lane vehicle's intention to change lanes to the next lane.

The controller 120 may determine an after-next lane vehicle's intention to change lanes to the next lane based on vehicle information, and may determine that the after-next lane vehicle is unlikely to enter the next lane if there is no after-next lane vehicle's intention to change lanes to the next lane.

Specifically, the controller 120 may determine the after-next lane vehicle's intention to enter the next lane by determining at least one of an after-next lane vehicle's heading angle, a lateral distance-to-after-next lane vehicle situation, or an after-next lane vehicle's predicted path based on the vehicle information.

That is, the controller 120 may determine an after-next lane vehicle's heading angle situation based on the vehicle information and determine that there is an after-next lane vehicle's intention to enter the next lane if the after-next lane vehicle's heading angle situation is a lane entering heading angle situation.

The controller 120 may determine an after-next lane vehicle's heading angle situation based on the vehicle information and determine that there is no after-next lane vehicle's intention to enter the next lane if the after-next lane vehicle's heading angle situation is not a lane entering heading angle situation.

Here, the vehicle information may be an after-next lane vehicle's heading angle.

Therefore, the controller 120 may determine that there is an after-next lane vehicle's intention to enter the next lane if an after-next lane vehicle's heading angle is a lane entering heading angle.

The controller 120 may determine that there is no after-next lane vehicle's intention to enter the next lane if an after-next lane vehicle's heading angle is not a lane entering heading angle.

Further, the controller 120 may determine a lateral distance-to-after-next lane vehicle situation based on the vehicle information and determine that there is an after-next lane vehicle's intention to enter the next lane if the lateral distance-to-after-next lane vehicle situation is a lane entering lateral distance situation.

The controller 120 may determine a lateral distance-to-after-next lane vehicle situation based on the vehicle information and determine that there is no after-next lane vehicle's intention to enter the next lane if the lateral distance-to-after-next lane vehicle situation is not a lane entering lateral distance situation.

Here, the vehicle information may be a lateral distance-to-after-next lane vehicle.

Therefore, the controller 120 may determine that there is an after-next lane vehicle's intention to enter the next lane if the lateral distance-to-after-next lane vehicle is not a lane entering lateral distance.

Further, the controller 120 may determine an after-next lane vehicle's predicted path situation based on the vehicle information, and may determine that there is an after-next lane vehicle's intention to enter the next lane if the after-next lane vehicle's predicted path situation is a predicted lane entering path situation.

The controller 120 may determine an after-next lane vehicle's predicted path situation based on the vehicle information, and may determine that there is no after-next lane vehicle's intention to enter the next lane if the after-next lane vehicle's predicted path situation is not a predicted lane entering path situation.

Here, the vehicle information may include at least one of an after-next lane vehicle's heading angle or an after-next lane vehicle's speed.

Therefore, the controller 120 may determine an after-next lane vehicle's predicted path based on the after-next lane vehicle's heading angle and the after-next lane vehicle's speed, and determine that there is an after-next lane vehicle's intention to enter the next lane e if the after-next lane vehicle's predicted path is a predicted lane entering path.

The controller 120 may determine an after-next lane vehicle's predicted path based on the after-next lane vehicle's heading angle and the after-next lane vehicle's speed, and determine that there is no after-next lane vehicle's intention to enter the next lane if the after-next lane vehicle's predicted path is not a predicted lane entering path.

On the other hand, if the vehicle is unlikely to change lanes to the after-next lane, the after-next lane vehicle's intention to enter the next lane may be performed by the controller. That is, the controller may determine a possibility of a host vehicle changing lanes to the after-next lane based on the vehicle information, and if there is no possibility of the host vehicle changing lanes to the after-next lane, the controller may determine a possibility of an after-next lane vehicle entering the next lane. As described above, the vehicle control device according to the embodiments may determine that the after-next lane vehicle is likely to enter the next lane if there is no possibility of the host vehicle changing lanes to the after-next lane, and suppress the issuance of the warning if there is no possibility of the after-next lane vehicle entering the next lane to prevent an unnecessary warning from being issued, thereby increasing the accuracy of the issuance of the warning.

In other words, with the above-mentioned functions, the vehicle control device according to the present embodiments may output a warning that is appropriate to the driving environment, thereby preventing an unnecessary warning from being issued.

On the other hand, the vehicle control device 100 according to the present embodiments may be implemented as an electronic control unit (ECU). The electronic control unit may be implemented via the computer system of FIG. 12.

In the following, a vehicle control method according to the present embodiments will be described with reference to the accompanying drawings. The vehicle control device according to the present embodiments described above with reference to FIGS. 1 to 6 may be applied to the vehicle control method according to the present embodiments. Accordingly, overlapped portions of the vehicle control device according to the embodiments described above with reference to FIGS. 1 to 6 will be omitted hereinafter to the maximum for simplicity of description.

FIGS. 7 to 10 are diagrams illustrating a vehicle control method according to embodiments of the present disclosure.

Referring to FIGS. 7 to 10, the vehicle control method according to the present embodiments may include at least one of the following stages: a lane change-to-next lane-ON stage (S100), a turn signal-ON stage (S200), a vehicle information acquisition stage (S300), a vehicle control stage (S400), and a turn signal-OFF stage (S500).

For example, the vehicle control method according to embodiments may control a vehicle via a controller. In particular, the vehicle control method according to the embodiments may include a stage of determining, during a next lane change activation period during which a host vehicle is able to change lanes from a travel lane to a next lane, at least one of a possibility of the host vehicle changing lanes to an after-next lane or a possibility of an after-next lane vehicle entering the next lane based on vehicle information, and control a warning device to control a warning to be issued to the host vehicle based on the determination results.

The stage of controlling the warning may be included in the vehicle control stage (S400).

Here, the next lane activating period may include a time period from a first time point that is a turn signal-on time point to a fourth time point that is a turn signal-off time point, wherein in the time period between the first time point and the fourth time point, a second time point at which a host vehicle initiates the lane change from the travel lane to the next lane, and a third time point at which the host vehicle completes the lane change from the travel lane to the next lane.

Here, the warning control stage may include determining, during the time period from the third time point to the fourth time point, at least one of a possibility of a host vehicle changing lanes to the after-next lane, or a possibility of an after-next lane vehicle entering the next lane based on the vehicle information, and controlling the warning to be issued to the vehicle based on the determination results.

When the host vehicle is likely to change lanes to the after-next lane during the time period from the third time point to the fourth time point, the warning control stage may control the issuance of the warning to be maintained, and when the host vehicle is unlikely to change lanes to the after-next lane, if there is a possibility of the after-next lane vehicle entering the next lane, the warning control stage may control the issuance of the warning to be maintained, and if there is no possibility of the after-next lane vehicle entering the next lane, the warning control stage may control the issuance of the warning to be suppressed.

Here, in the warning control stage, it may be controlled such that if a vehicle is not present within a predetermined range on the next lane during the time period from the first time point to the third time point so that a warning is not issued, if a vehicle is not present within a predetermined range on an after-next lane during the time period from the third time point to the fourth time point, the warning is not being issued, and if a vehicle is present within a predetermined range on an after-next lane during the time period from the third time point to the fourth time point, the warning is issued. In this state, if there is a possibility of the vehicle changing lanes to the after-next lane, the issuance of the warning is maintained, and if there is no possibility of the vehicle changing lanes to the after-next lane, the issuance of the warning is maintained if the after-next lane vehicle is likely to enter the next lane, and the issuance of the warning is suppressed if the after-next lane vehicle is unlikely to enter the next lane.

Here, in the warning control stage, it may be controlled such that if a vehicle is present within a predetermined range on the next lane during the time period from the first time point to the third time point so that a warning is issued, if a vehicle is not present within a predetermined range on an after-next lane during the time period from the third time point to the fourth time point, the issuance of the warning is terminated, and if a vehicle is present within a predetermined range on an after-next lane during the time period from the third time point to the fourth time point, the issuance of the warning is maintained. In this state, if there is a possibility of the vehicle changing lanes to the after-next lane, the issuance of the warning is maintained, and if there is no possibility of the vehicle changing lanes to the after-next lane, the issuance of the warning is maintained if the after-next lane vehicle is likely to enter the next lane, and the issuance of the warning is suppressed if the after-next lane vehicle is unlikely to enter the next lane.

Here, the warning control stage may include determining a driver's intention to change lanes to the after-next lane based on the vehicle information, and determining a possibility of the vehicle changing lanes to the next lane based on the determination results.

Here, the warning control stage may include determining an after-next lane vehicle's intention to enter the next lane based on the vehicle information, and determining a possibility of the after-next lane vehicle entering the next lane based on the determination results.

Figure 7:
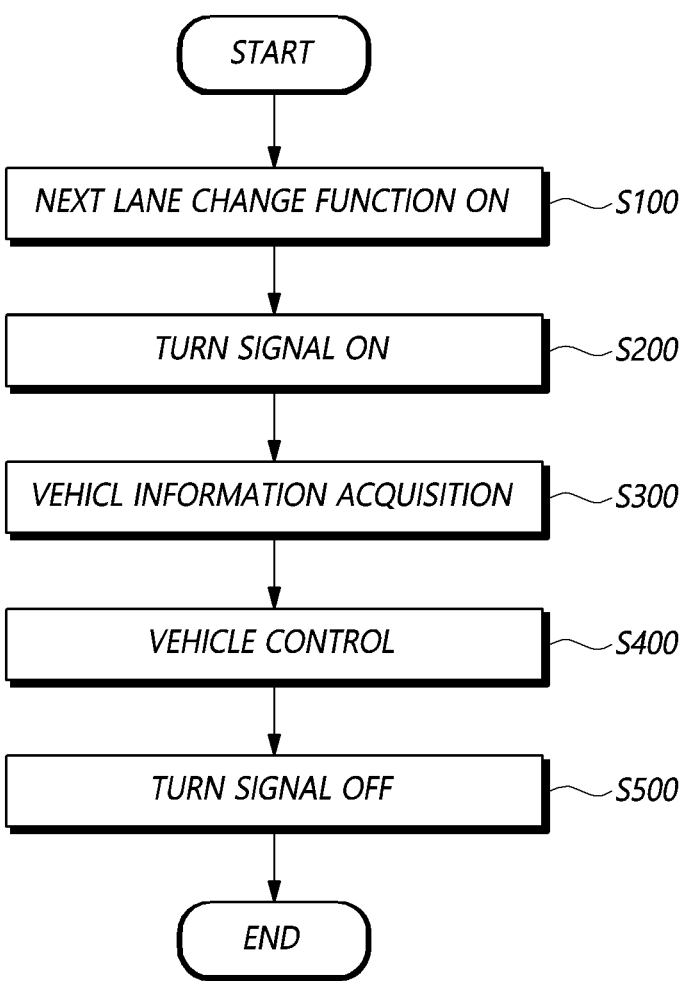
FIGS. 7 to 10 are diagrams illustrating a vehicle control method according to embodiments.

Referring to FIG. 7, first, the next lane change function may be turned on (S100).

Then, the turn signal may be turned on (S200).

Then, vehicle information may be obtained (S300).

Based on vehicle information, a host vehicle may be controlled (S400). In particular, in S400, the host vehicle may be controlled to change lanes from the travel lane to the next lane, and from the next lane to the after-next lane. Further, in S400, a warning device may be controlled to control a warning to be issued from the host vehicle.

Subsequently, the turn signal may be turned off (S500).

Figure 8:
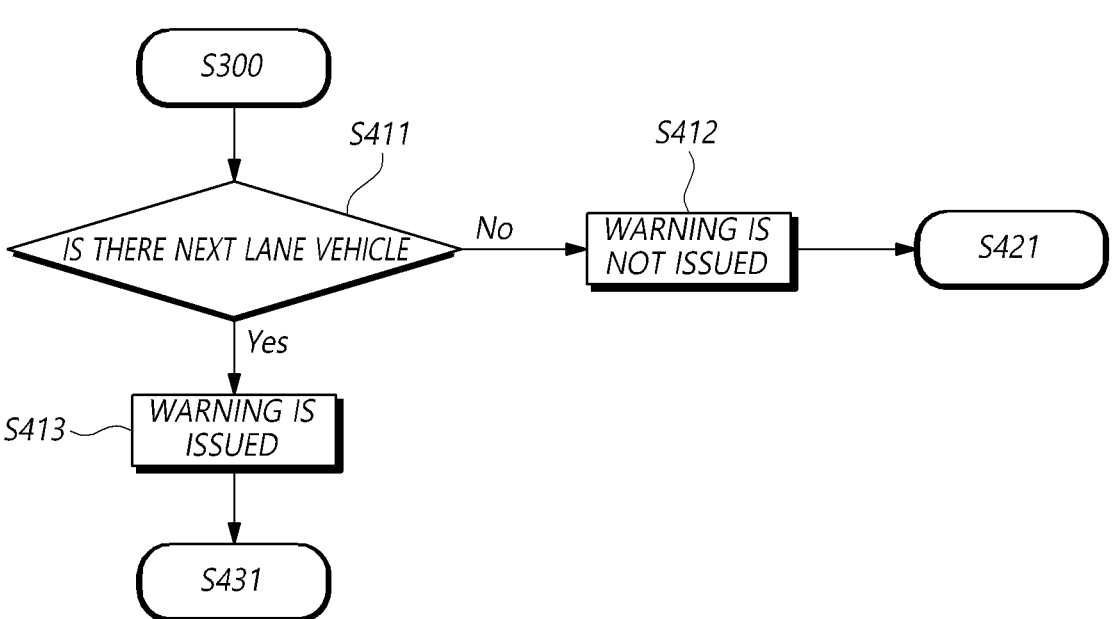

Referring to FIG. 8, if the turn signal is turned on (S200) while the host vehicle is traveling on the travel lane, it may be determined (S411) whether a vehicle is present on the next lane within a predetermined range during a time period from a first time point to a third time point.

Then, if a vehicle is not present on the next lane within the predetermined range, the warning may be controlled not to be issued (S412). In addition, the vehicle may be controlled to complete the lane change from the travel lane to the next lane.

Further, if a vehicle is present on the next lane within a predetermined range, a warning may be controlled to be issued (S413). In addition, the vehicle may be controlled to complete the lane change from the travel lane to the next lane.

Figure 9:
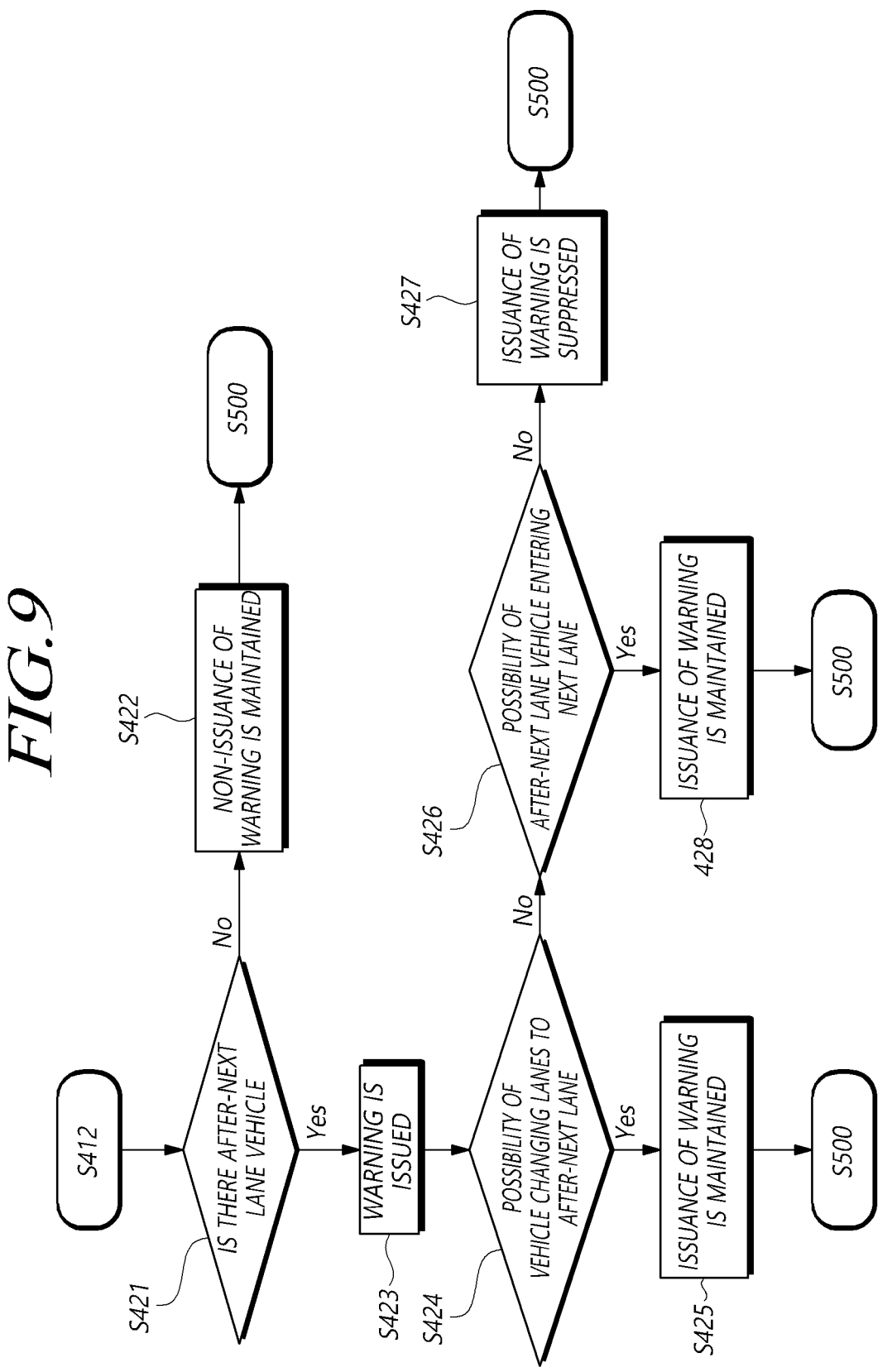

Referring to FIG. 9, if a vehicle is not present on the next lane within a predetermined range during a time period from a first time point to a third time point so that a warning is controlled not to be issued (S412), during a time period from the third time t point to a fourth time point, it may be determined if a vehicle is present on the after-next lane within a predetermined range (S421).

Then, if a vehicle is not present on the after-next lane within the predetermined range during the time period from the third time point to the fourth time point, it may be controlled such that no warning is being maintained (S422). In addition, the vehicle may be controlled to cause the vehicle to change lanes from the next lane to the after-next lane, or the vehicle to travel on the next lane. Then, the turn signal may be turned off (S500).

Further, if a vehicle is present on the after-next lane within a predetermined range during the time period from the third time point to the fourth time point, a warning may be controlled so as to be issued (S423).

Then, based on the vehicle information, a possibility of the vehicle changing lanes to the after-next lane may be determined (S424).

Then, if there is the possibility of the vehicle changing lanes to the after-next lane, it may be controlled such that the issuance of the warning is maintained (S425). In addition, the vehicle may be controlled to complete the lane change from the next lane to the after-next lane. Then, the turn signal may be turned off (S500).

Further, if the vehicle is unlikely to change to the after-next lane, the possibility of the after-next lane vehicle entering the next lane may be determined based on the vehicle information (S426).

Then, whether the after-next lane vehicle is likely to enter the next lane may be determined (S426).

Then, if the after-next lane vehicle is likely to enter the next lane, it may be controlled such that the issuance of the warning is maintained (S428). In addition, the vehicle may be controlled to travel on the next lane. Then, the turn signal may be turned off (S500).

Further, if the after-next lane vehicle is unlikely to enter the next lane, it may be controlled such that the issuance of the warning is suppressed (S427). In addition, the vehicle may be controlled to travel on the next lane. Then, the turn signal may be turned off (S500).

Figure 10:
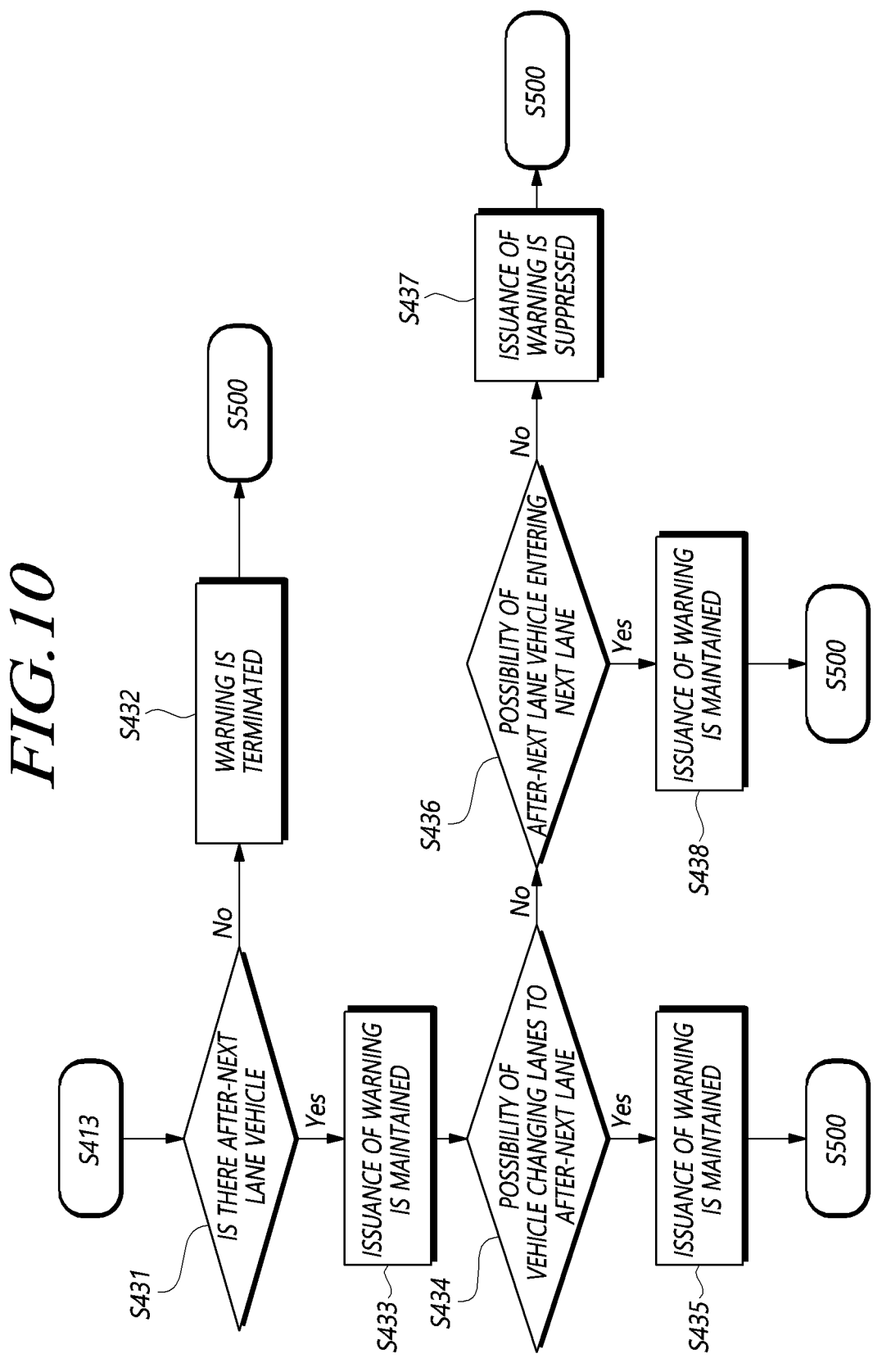

Referring to FIG. 10, if a vehicle is present on the next lane within a predetermined range during a time period from a first time point to a third time point such that a warning is controlled so as to be issued (S431), it may be determined if a vehicle is present on the after-next lane within the predetermined range during a time period from the third time point to a fourth time point (S431).

Then, if a vehicle is not present on the after-next lane within the predetermined range, the issuance of the warning may be controlled to terminate (S432). In addition, the vehicle may be controlled to change lanes from the next lane to the after-next lane, or the vehicle may be controlled to travel on the next lane. Then, the turn signal may be turned off (S500).

Furthermore, if the vehicle is present on the after-next lane within the predetermined range, it may be controlled so that the issuance of the warning is maintained (S433).

Then, based on the vehicle information, the possibility of the vehicle changing lanes to the after-next lane may be determined (S434).

Then, if the vehicle is likely to change lanes to the after-next lane, it may be controlled so that the issuance of the warning is maintained (S435). In addition, the vehicle may be controlled to complete the lane change from the next lane to the after-next lane. The turn signal may then be turned off.

Further, if the vehicle is unlikely to change lanes to the after-next lane, the possibility of the after-next lane vehicle entering the next lane may be determined based on the vehicle information (S436).

Then, if the after-next lane vehicle is likely to enter the next lane, it may be controlled so that the issuance of the warning is maintained (S438). In addition, the vehicle may be controlled to travel on the next lane. Then, the turn signal may be turned off (S500).

Further, if the after-next lane vehicle is unlikely to enter the next lane, it may be controlled so that the issuance of the warning is suppressed (S437). In addition, the vehicle may be controlled to travel on the next lane. Then, the turn signal may be turned off (S500).

In the following, a vehicle system according to the present embodiments will be described with reference to the accompanying drawings. The vehicle control device and method according to the embodiments described above with reference to FIGS. 1 to 10 may be applied to the vehicle system according to the embodiments. Accordingly, overlapped portions of the vehicle control device and method according to the embodiments described above with reference to FIGS. 1 to 10 will be omitted hereinafter to the maximum for simplicity of description.

Figure 11:
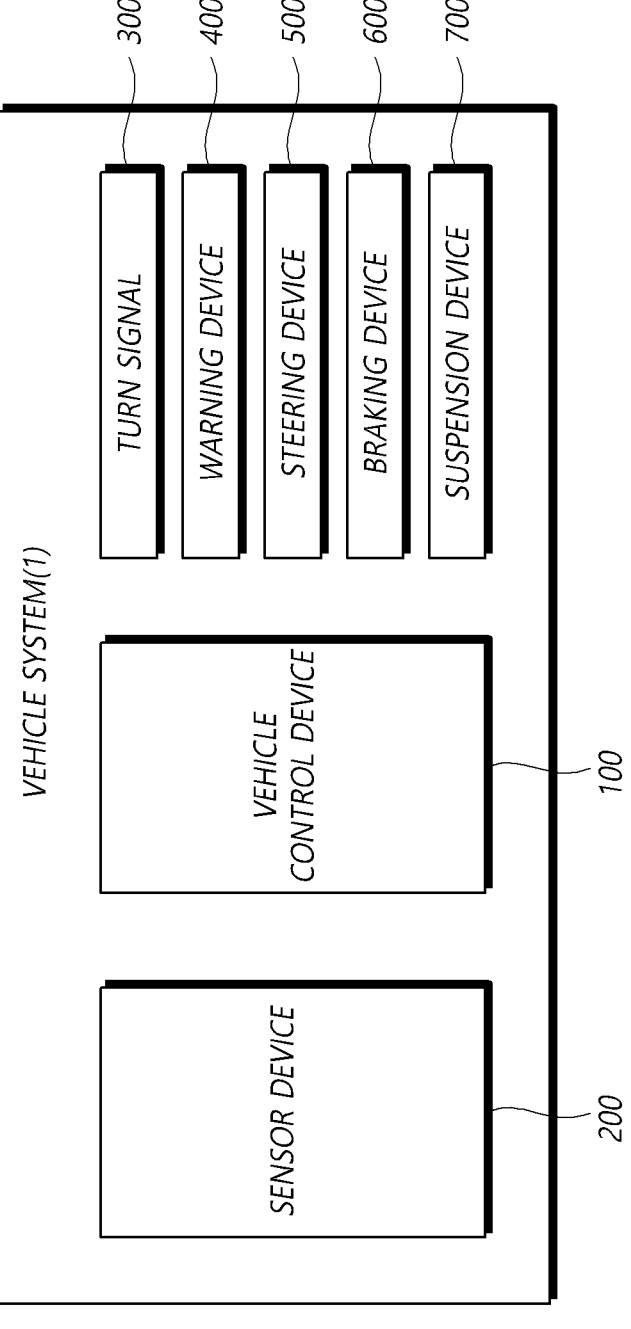
FIG. 11 is a diagram illustrating a vehicle system according to embodiments.

FIG. 11 is a diagram illustrating a vehicle system according to embodiments of the present disclosure.

Referring to FIG. 11, the vehicle system 1 according to the present embodiments may include at least one of a vehicle control device 100, a sensor device 200, a turn signal 300, a warning device 400, a steering device 500, a braking device 600, or a suspension device 700. The vehicle control device 100, the sensor device 200, the turn signal 300, the warning device 400, the steering device 500, the braking device 600, and the suspension device 700 may be coupled to each other.

The vehicle system 1 according to the present embodiments includes the vehicle control device 100 having a controller 120 operated to control a vehicle, and the warning device 400 operated to issue a warning to the vehicle. Here, the controller 120 may determine, during a next lane change activation period during which a host vehicle is able to change lanes from a travel lane to a next lane, at least one of a possibility of the host vehicle changing lanes to an after-next lane or a possibility of a vehicle on the after-next lane entering the next lane based on vehicle information and control the warning device to issue a warning to the host vehicle based on the determination results.

Specifically, the vehicle control device 100 has been described above with reference to FIGS. 1 to 10, so a detailed description thereof will be omitted below for simplicity of explanation.

The sensor device 200 may obtain vehicle information via at least one sensor.

Although the sensor may include, but is not limited to, at least one of a steering angle sensor, a steering torque sensor, a speed sensor, a yaw rate sensor, a radar sensor, a camera sensor, a lidar sensor, or an ultrasonic sensor, the sensor may include any sensor capable of acquiring vehicle information as described in these embodiments, as well as any sensor capable of acquiring vehicle information necessary to drive the vehicle.

The turn signal 300 may indicate a vehicle traveling direction and may be referred to as a turn indicator.

In the present embodiments, the possibility of the vehicle changing lanes to the after-next lane and the possibility of the after-next lane vehicle entering the next lane may be determined during the turn signal activation period, i.e., the next lane change activation period, which is the on-section of the turn signal.

Here, although the turn signal 300 may include at least one of, but not limited to, a one-touch triggered type turn signal or a full-turn triggered type turn signal, the present disclosure may include any type of turn signal capable of indicating the vehicle traveling direction.

Here, for the one-touch triggered type, the turn signal may be automatically turned off when the vehicle has completed changing lanes from the travel lane to the next lane because the switch of the turn signal is returned to a neutral position.

Here, for the pull-turn triggered type, the turn signal may remain active (i.e., the turn signal may remain on) even after the vehicle has completed changing lanes from the travel lane to the next lane because the switch of the turn signal is locked in that direction.

Accordingly, in the present embodiments, the turn signal may preferably be of the pull-turn triggered type, but the present disclosure is not limited thereto. That is, the one-touch triggered type turn signal may be designed to turn off after a predetermined time when the vehicle has completed changing lanes from the travel lane to the next lane.

Thus, according to the present embodiments, the determination of the possibility of the vehicle changing lanes to the after-next lane and the possibility of the after-next lane vehicle entering the next lane may be applied in any situation, as long as the turn signal remains on.

The waring device 400 may issue a warning to the vehicle.

Although the warning device 400 may include at least one of, but not limited to, a visual device, an audible device, or a tactile device, the present disclosure may include any device capable of issuing a warning.

In particular, the warning device 400 may include a vehicle-mounted audio, video, and navigation (AVN) system.

The steering device 500 may steer a vehicle. The steering device has been described above with reference to FIG. 1, so a description thereof will be omitted below for simplicity of description.

The braking device 600 may slow or stop a vehicle.

The suspension device 700 may shock-absorb a vehicle.

The braking device 600 and the suspension device 700 may employ any device known in the art, so a description thereof will be omitted below for simplicity of description.

The turn signal 300, warning device 400, steering device 500, braking device 600, and suspension device 700 may be controlled by the vehicle control device 100.

Figure 12:
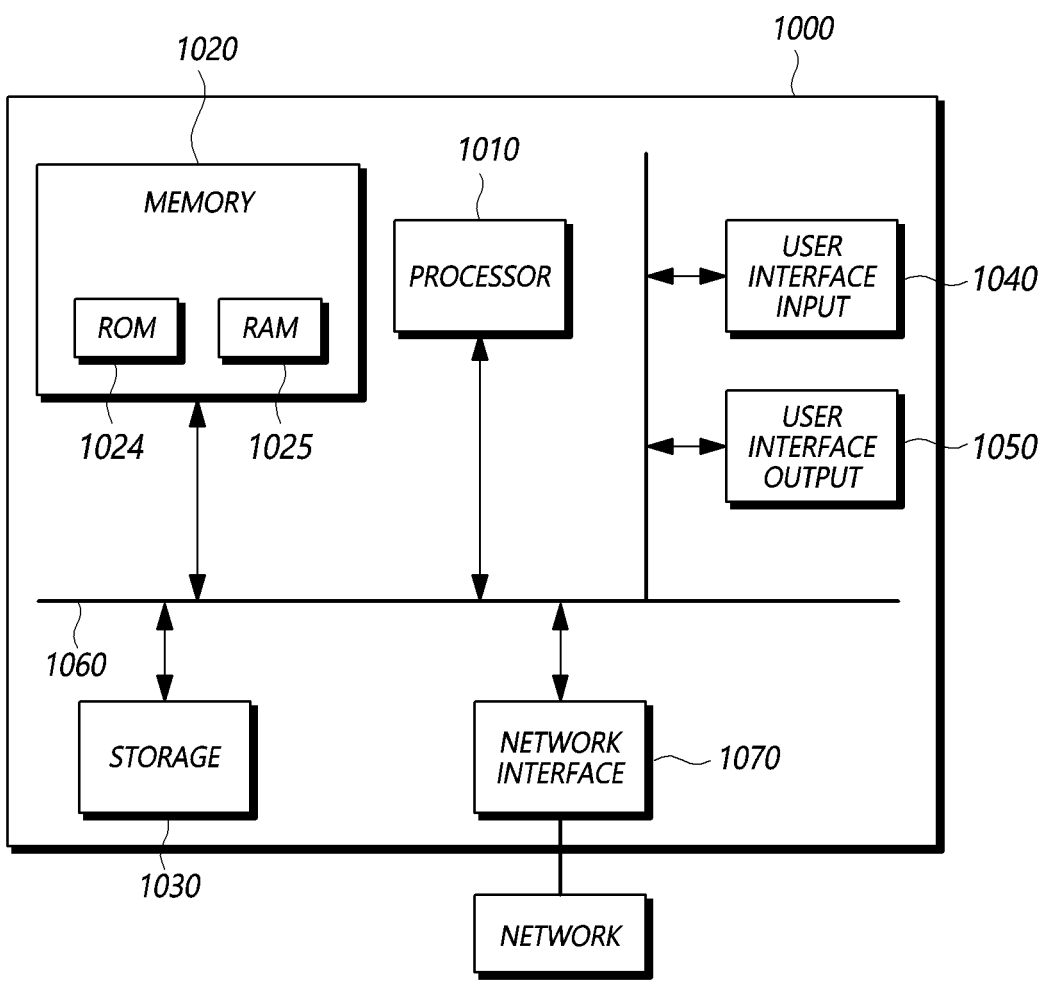
FIG. 12 is a diagram illustrating a computer system of a vehicle control device and a vehicle system according to embodiments.

FIG. 12 is a diagram illustrating a computer system of a vehicle control device and a vehicle system according to embodiments of the present disclosure.

Referring to FIG. 12, the above-described embodiments may be implemented in a computer system, for example, as a computer-readable recording medium. As illustrated, a computer system 1000, such as a vehicle control device and a vehicle system, may include at least one of the following elements: one or more processors 1010, a memory 1020, a storage 1030, a user interface input 1040, and a user interface output 1050, which may communicate with each other via a bus 1060. The computer system 1000 may also include a network interface 1070 for connecting to a network. The processor 1010 may be a CPU or semiconductor device that executes processing instructions stored in memory 1020 and/or storage 1030. Memory 1020 and storage 1030 may include various types of volatile and non-volatile memory media. For example, the memory may include ROM 1024 and RAM 1025.

Accordingly, the present embodiments may be implemented as computer-implemented methods or non-volatile computer recording media on which computer-executable instructions are stored. The instructions, when executed by a processor, may perform the methods according to at least one embodiment of the present disclosure.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A vehicle control device comprising a processor executing processing instructions stored in a memory:

wherein the processor includes a controller operative to control a host vehicle, wherein the controller is operative to determine, during a next lane change activation period during which the host vehicle is able to change lanes from a travel lane to a next lane, at least one of a possibility of the host vehicle changing lanes to an after-next lane or a possibility of an after-next lane vehicle entering the next lane based on vehicle information, and control a warning to be issued to the host vehicle based on the determination results, wherein the next lane activation period includes a time period from a first time point that is a turn signal-on time point to a fourth time point that is a turn signal-off time point, wherein in the time period between the first time point and the fourth time point, a second time point at which the host vehicle initiates the lane change from the travel lane to the next lane, and a third time point at which the host vehicle completes the lane change from the travel lane to the next lane, wherein if a vehicle is not present within a predetermined range on the next lane during the time period from the first time point to the third time point, the controller controls a warning not to be issued, if a vehicle is not present within a predetermined range on the after-next lane during the time period from the third time point to the fourth time point, the controller continuously controls a warning not to be issued, if a vehicle is present within a predetermined range on the after-next lane during the time period from the third time point to the fourth time point, the controller controls a warning to be issued, and in this situation, if there is the possibility of the vehicle changing lanes to the after-next lane, the controller controls the issuance of the warning to be maintained, and if there is no possibility of the vehicle changing lanes to the after-next lane, the controller controls the issuance of the warning to be maintained if there is the possibility of the after-next lane vehicle entering the next lane, and controls the issuance of the warning to be suppressed if there is no possibility of the after-next lane vehicle entering the next lane, wherein the controller is configured to control at least one of a turn signal, a warning device issuing the warning, a steering device, a braking device, and a suspension device to control the host vehicle to perform at least one of completing the lane change, traveling the next lane, and avoiding collision.

2. The vehicle control device of claim 1, wherein the controller is operative to determine, during the time period from the third time point to the fourth time point, at least one of the possibility of the host vehicle changing lanes to the after-next lane or the possibility of the after-next lane vehicle entering the next lane based on the vehicle information, and control a warning to be issued to the host vehicle based on the determination results.

3. The vehicle control device of claim 2, wherein during the time period from the third time point to the fourth time point, if there is the possibility of the host vehicle changing lanes to the after-next lane, the controller is operative to control the issuance of the warning to be maintained, and if there is no possibility of the host vehicle changing lanes to the after-next lane, the controller controls the issuance of the warning to be maintained if there is the possibility of the after-next lane vehicle entering the next lane, and the controller controls the issuance of the warning to be suppressed if there is no possibility of the after-next lane vehicle entering the next lane.

4. The vehicle control device of claim 3, wherein if a vehicle is present within a predetermined range on the next lane during the time period from the first time point to the third time point, the controller controls a warning to be issued, if a vehicle is not present within a predetermined range on the after-next lane during the time period from the third time point to the fourth time point, the controller controls the issuance of the warning to be terminated,

if a vehicle is present within a predetermined range on the after-next lane during the time period from the third time point to the fourth time point, the controller controls the issuance of the warning to be maintained, and in this situation, if there is the possibility of the vehicle changing lanes to the after-next lane, the controller controls the issuance of the warning to be maintained, and if there is no possibility of the vehicle changing lanes to the after-next lane, the controller controls the issuance of the warning to be maintained if there is the possibility of the after-next lane vehicle entering the next lane, and controls the issuance of the warning to be suppressed if there is no possibility of the after-next lane vehicle entering the next lane.

5. The vehicle control device of claim 1, wherein the controller determines a driver's intention to change lanes to the after-next lane based on the vehicle information, and determines the possibility of the vehicle changing lanes to the after-next lane based on the determination results.

6. The vehicle control device of claim 1, wherein the controller determines an after-next lane vehicle's intention to enter the next lane based on the vehicle information, and determines the possibility of the after-next lane vehicle entering the next lane based on the determination results.

7. The vehicle control device of claim 1, wherein the controller determines the possibility of the host vehicle changing lanes to the after-next lane based on the vehicle information, and determines the possibility of the after-next lane vehicle entering the next lane if there is no possibility of the host vehicle changing lanes to the after-next lane.

8. A vehicle control method performed by a processor executing processing instructions stored in a memory, the method comprising:

determining, during a next lane change activation period during which a host vehicle is able to change lanes from a travel lane to a next lane, at least one of a possibility of the host vehicle changing lanes to an after-next lane or a possibility of an after-next lane vehicle entering the next lane based on vehicle information, and controlling a warning device to control a warning be issued to the host vehicle based on the determination results, wherein the next lane activation period includes a time period from a first time point that is a turn signal-on time point to a fourth time point that is a turn signal-off time point, wherein in the time period between the first time point and the fourth time point, a second time point at which the host vehicle initiates the lane change from the travel lane to the next lane, and a third time point at which the host vehicle completes the lane change from the travel lane to the next lane, wherein in the warning control stage, if a vehicle is not present within a predetermined range on the next lane during the time period from the first time point to the third time point, a warning is controlled not to be issued, if a vehicle is not present within a predetermined range on the after-next lane during the time period from the third time point to the fourth time point, a warning is continuously controlled not to be issued, if a vehicle is present within a predetermined range on the after-next lane during the time period from the third time point to the fourth time point, a warning is controlled to be issued, and in this situation, if there is the possibility of the vehicle changing lanes to the after-next lane, the issuance of the warning is controlled to be maintained, and if there is no possibility of the vehicle changing lanes to the after-next lane, the issuance of the warning is controlled to be maintained if there is the possibility of the after-next lane vehicle entering the next lane, and the issuance of the warning is controlled to be suppressed if there is no possibility of the after-next lane vehicle entering the next lane, controlling at least one of a turn signal, a warning device issuing the warning, a steering device, a braking device, and a suspension device to control the host vehicle to perform at least one of completing the lane change, traveling the next lane, and avoiding collision.

9. The vehicle control method of claim 8, wherein the warning control stage comprises determining, during the time period from the third time point to the fourth time point, at least one of the possibility of the host vehicle changing lanes to the after-next lane or the possibility of the after-next lane vehicle entering the next lane based on the vehicle information, and control a warning to be issued to the host vehicle based on the determination results.

10. The vehicle control method of claim 9, wherein in the warning control stage, during the time period from the third time point to the fourth time point, if there is the possibility of the host vehicle changing lanes to the after-next lane, the issuance of the warning is controlled to be maintained, and if there is no possibility of the host vehicle changing lanes to the after-next lane, the issuance of the warning is controlled to be maintained if there is the possibility of the after-next lane vehicle entering the next lane, and the issuance of the warning is controlled to be suppressed if there is no possibility of the after-next lane vehicle entering the next lane.

11. The vehicle control method of claim 10, wherein in the warning control stage, if a vehicle is present within a predetermined range on the next lane during the time period from the first time point to the third time point, a warning is controlled to be issued, if a vehicle is not present within a predetermined range on the after-next lane during the time period from the third time point to the fourth time point, the issuance of the warning is controlled to be terminated, if a vehicle is present within a predetermined range on the after-next lane during the time period from the third time point to the fourth time point, the issuance of the warning is controlled to be maintained, and in this situation, if there is the possibility of the vehicle changing lanes to the after-next lane, the issuance of the warning is controlled to be maintained, and if there is no possibility of the vehicle changing lanes to the after-next lane, the issuance of the warning is controlled to be maintained if there is the possibility of the after-next lane vehicle entering the next lane, and the issuance of the warning is controlled to be suppressed if there is no possibility of the after-next lane vehicle entering the next lane.

12. The vehicle control method of claim 8, wherein the warning control stage comprises determining a driver's intention to change lanes to the after-next lane based on the vehicle information, and determining the possibility of the vehicle changing lanes to the after-next lane based on the determination results.

13. The vehicle control method of claim 8, wherein the warning control stage comprises determining an after-next lane vehicle's intention to enter the next lane based on the vehicle information, and determining the possibility of the after-next lane vehicle entering the next lane based on the determination results.

14. A vehicle system comprising:

a vehicle control device including a processor executing processing instructions stored in a memory, the processor including a controller operative to control a host vehicle; and a warning device operative to issue a warning to the host vehicle, wherein the controller is operative to determine, during a next lane change activation period during which the host vehicle is able to change lanes from a travel lane to a next lane, at least one of a possibility of the host vehicle changing lanes to an after-next lane or a possibility of a vehicle on the after-next lane entering the next lane based on vehicle information, and control the warning device to issue a warning to the host vehicle based on the determination results, wherein the next lane activation period includes a time period from a first time point that is a turn signal-on time point to a fourth time point that is a turn signal-off time point, wherein in the time period between the first time point and the fourth time point, a second time point at which the host vehicle initiates the lane change from the travel lane to the next lane, and a third time point at which the host vehicle completes the lane change from the travel lane to the next lane, wherein if a vehicle is not present within a predetermined range on the next lane during the time period from the first time point to the third time point, the controller controls a warning not to be issued, if a vehicle is not present within a predetermined range on the after-next lane during the time period from the third time point to the fourth time point, the controller continuously controls a warning not to be issued, if a vehicle is present within a predetermined range on the after-next lane during the time period from the third time point to the fourth time point, the controller controls a warning to be issued, and in this situation, if there is the possibility of the vehicle changing lanes to the after-next lane, the controller controls the issuance of the warning to be maintained, and if there is no possibility of the vehicle changing lanes to the after-next lane, the controller controls the issuance of the warning to be maintained if there is the possibility of the after-next lane vehicle entering the next lane, and controls the issuance of the warning to be suppressed if there is no possibility of the after-next lane vehicle entering the next lane, wherein the controller is configured to control at least one of a turn signal, a warning device issuing the warning, a steering device, a braking device, and a suspension device to control the host vehicle to perform at least one of completing the lane change, traveling the next lane, and avoiding collision.

15. The vehicle system of claim 14, wherein the controller is operative to determine, during the time period from the third time point to the fourth time point, at least one of the possibility of the host vehicle changing lanes to the after-next lane or the possibility of the after-next lane vehicle entering the next lane based on the vehicle information, and control a warning to be issued to the host vehicle based on the determination results.

* * * * *